Figure 1:
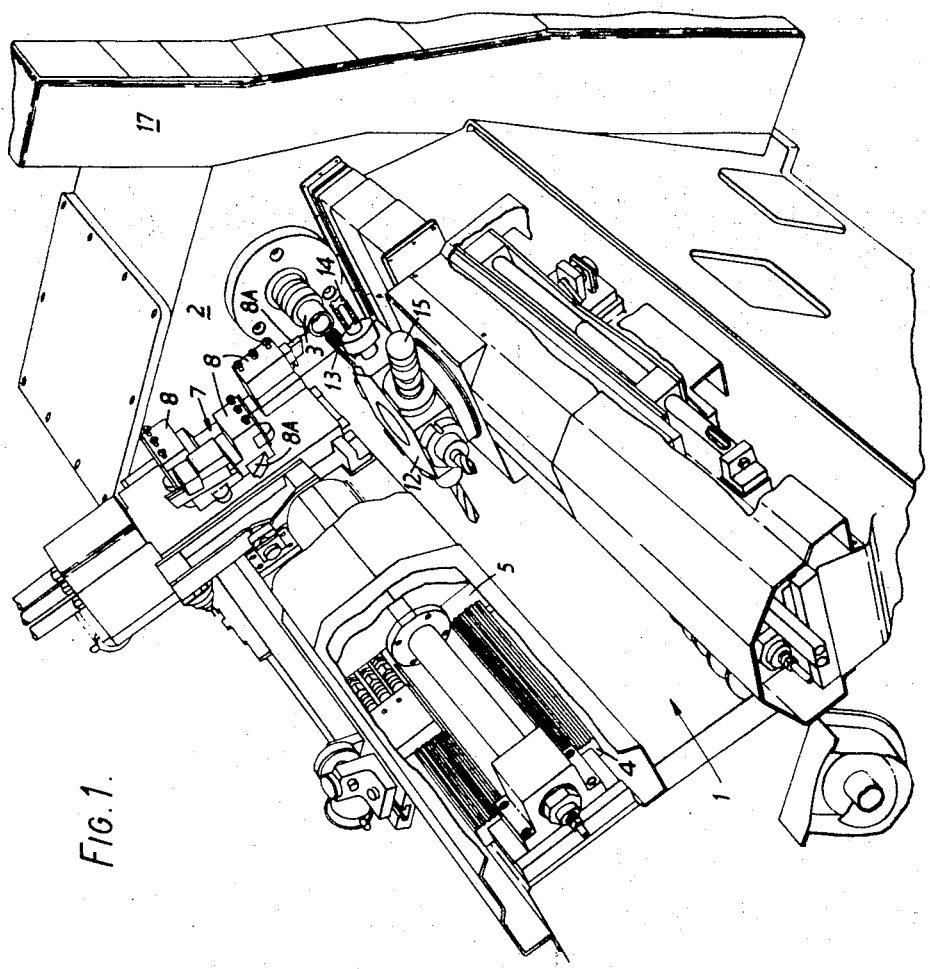

United States Patent [19]
Boyd et al.

[11] 3,726,571
[45] Apr. 10, 1973

[54] MACHINE TOOLS

[75] Inventors: Gordon A. Boyd, Dorking; Franz Berger, West Wickham, both of England

[73] Assignee: Autologic Limited, Mitcham, Surrey, England

[22] Filed: Jan. 25, 1971

[21] Appl. No.: 109,292

[30] Foreign Application Priority Data

Jan. 28, 1970 Great Britain.....................4,213/70

[52] U.S. Cl.................................................308/3
[51] Int. Cl....................................F16c 11/01
[58] Field of Search.....................308/3, 3 A, 5, 4

[56] References Cited

UNITED STATES PATENTS

| 291,398 | 1/1884 | Putnam | 308/3 |
| 1,540,132 | 6/1925 | Johannesmeyer et al. | 308/3 |

FOREIGN PATENTS OR APPLICATIONS 816,050  7/1959  Great Britain.....................308/3 A

*Primary Examiner*—Charles J. Myhre
*Assistant Examiner*—Frank Susko
*Attorney*—David A. Maxon

[57] ABSTRACT

A machine tool has a slide carrying a tool holder arranged to slide on a slideway which is fixed to the bed of the machine tool. The slide and slideway are provided with interengaging grooves and projections which extend in the direction of sliding movement, the grooves and projections being in the form of serrations. The slide and slideway are inclined at an angle to the horizontal.

5 Claims, 2 Drawing Figures

INVENTORS
GORDON A. BOYD
FRANZ BERGER

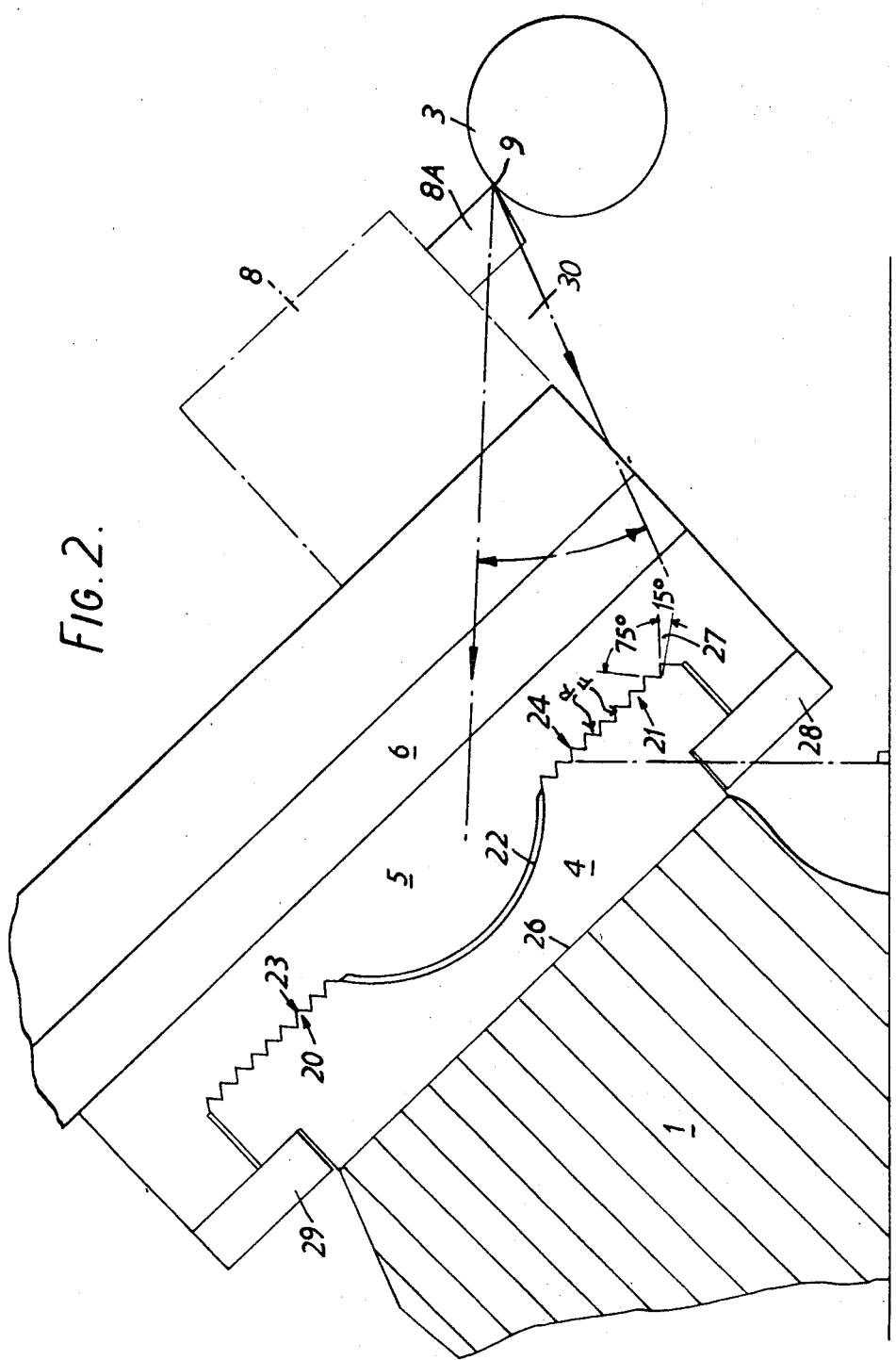

MACHINE TOOLS

This invention relates to machine tools and is concerned with a slide and slideway for a machine tool and a machine tool incorporating such a slide and slideway.

A slide and slideway for a machine tool according to the present invention comprises a slideway member adapted to be fixed to the machine tool and having slidably mounted thereon a movable slide member, the members being provided with inter-engaging projections and grooves extending in the direction of sliding movement, and the projections and grooves being in the form of serrations.

The serrations preferably have their sides inclined at the same angle to one another, i.e., to a center line and each of the serrations is conveniently of substantially V form in section.

Although the grooves and projections may extend over the whole of the engaging surfaces they are preferably arranged in two sets laterally spaced from one another.

The members may be arranged to be mounted at an angle to the horizontal, i.e., with the slide and slideway extending parallel to the machine tool axis, in which case the lower sides of the grooves in the slideway member may be inclined to the horizontal by an amount sufficient to provide a sitback angle, that is to say an angle which is sufficient to overcome any frictional resistance. An angle of approximately 15° has been found to be the minimum which is generally satisfactory.

The upper sides of the grooves of the lower member may be arranged to be vertical, and the members are preferably inclined at 45° to the vertical.

In addition, means may be provided for retaining the moving side on the slideway member so that in the event of any tendency to tilt the moving slide member with respect to the fixed slideway, the moving slide will be retained in position. In one form the retaining means may comprise keep plates adapted to be in slidable engagement with the base of the slideway member.

According to another aspect of the present invention a machine tool includes a slide member and slideway member as set forth.

The invention may be performed in various ways and one specific embodiment will now be described by way of example with reference to the accompanying drawings, in which:

FIG. 1 is an isometric general view of an automatic machine tool incorporating a slide and slideway according to the invention, and FIG. 2 is a cross-section through one of the slides and slideways shown in FIG. 1.

The machine tool shown in FIG. 1 comprises a machine bed indicated generally at 1 the upper surface of which is of generally V form in lateral section. In one end of the V a headstock indicated generally at 2 is mounted, the headstock 2 supporting, in the example shown, a workpiece 3 in a position for machining, the workpiece being arranged with its axis parallel to the axis of the machine bed. The workpiece 3 is the end of a bar which is fed through the headstock in conventional manner.

The inclined faces of the V are each respectively provided with a fixed slideway slidably supporting a moving slide, the left hand slide and slideway being shown exposed in FIG. 1 for convenience. The left hand fixed slideway, designated 4, slidably supports a moving slide 5 arranged for movement parallel to the axis of the machine tool, the moving slide carrying a compound slide 6 arranged for movement at right angles to the axis of movement of the moving slide 5 and parallel to the face of the V upon which it is mounted. The compound slide includes a turntable indicated generally at 7 carrying four tool holders 8 carrying tools 8A each of which can be selected and moves into an operative position such as that shown at 9 on the slide for engagement with the workpiece. In order to move the selected tool from the operative position into an engaged or cutting position with the workpiece the moving slide and the compound slide are each positioned by sliding movement controlled by appropriate control apparatus until the required position is reached and the operation carried out on the workpiece appropriately, and the tool is then retracted and replaced by another until the machining operations are completed.

The right hand face of the V-shaped recess in the bed also carries a similar slideway upon which is mounted a similar moving slide, but in this case the moving slide carries a capstan turret 12 provided with a number of tools 13, 14, 15 etc., for performing various other operations upon the work. The tools 7 and the tools 13, 14, 15 etc. on the capstan turret are arranged to be operated independently of each other and can perform operations upon the workpiece either simultaneously or separately or sequentially according to the programme set up on a control panel, a part of which is shown at 17.

The fixed slideway 4, the moving slide 5 and the part of the compound slide 6 are shown more clearly in FIG. 2. In this Figure it will be seen that the fixed slideway has a number of grooves in the form of serrations extending longitudinally along the fixed slideway and parallel to the axis of the machine tool. The serrations are arranged in two sets 20, 21 spaced from one another by a central longitudinally extending arcuate section recess 22. The moving slide also is correspondingly shaped to have on its base similar sets of serrations 23 and 24 arranged to engage the serrations 20 and 21 respectively, the sets 23 and 24 being spaced from one another by an arcuate section protrusion 25 arranged to project into the recess and spaced therefrom to provide clearance with the recess 22. In the example shown the face 26 of the machine bed to which the slideway is secured is inclined at 45° to the horizontal so that the slideway is inclined at an angle of 45° to the vertical. The serrations are each formed with a face indicated by the reference R which is arranged vertically and another face indicated by the reference F arranged at an angle of 150° to the horizontal, as indicated by the angle shown at 27 in FIG. 2. Keep plates 28 are provided to retain the moving slide on the fixed slideway and are in slidable engagement with the base of the slide-way member.

It will be appreciated that for a given width W of a set of serrations of the slide, i.e., the width of the serrations 20, 23 or 21, 24 and the number of teeth T in each set, a bearing surface will be presented to the resultant cutting force equal if not greater than W itself, life and wear being the function of the presented effective width W. Also during roughing, face R and seldom face F is presented to the cutting force so that face F receives relatively little wear, this being so because the moment distribution caused by the resultant cutting force overcomes the natural weight of the slide during heavy cuts. When finishing the weight of the slide overcomes the resultant cutting force and face F forms the bearing reaction surface, the 15° sitback being provided to allow the slide to take up a loading condition, i.e., attempting to sit back on the keep plates 28 and face R, hence providing greater stability than attempting to slide off face F were the angle the other way. The span angle of the resultant tool forces is shown by the angle indicated by 30.

What we claim as our invention and desire to secure by letters patent of the United States:

1. In a combination of a slideway member and a movable slide member, the improvements comprising:
   the slideway member being mounted at an angle to the horizontal and having slidably mounted thereon the movable slide member;
   said members being provided with interengaging projec-tions and grooves extending longitudinally in a direction of sliding movement;
   each of the projections and grooves is of substantially V form in section;
   and the surfaces provided by the said projections and grooves providing discrete bearing surfaces respectively for vertical and horizontal loads;
   the lower sides of the grooves in the slideway member being inclined to the horizontal by an amount sufficient to provide a sitback angle.

2. The combination in claim 1 in which the angle is not less than 15°.

3. The combination of claim 1 in which the upper sides of the grooves in the lower member are arranged to be vertical.

4. The combination of claim 1 in which the members are inclined at 45° to the vertical.

5. The combination of claim 1 in which the slide member also carries a tool holder slide movable about an axis at an angle to the axis of movement of the movable slide member.

* * * * *